Oct. 18, 1932.  S. H. HALE ET AL  1,882,823
APPARATUS FOR HARVESTING CORN
Filed Jan. 20, 1930  4 Sheets-Sheet 3

INVENTOR
Stephen H. Hale
Wayne H. Worthington
and Torvald N. Pierson
ATTORNEY

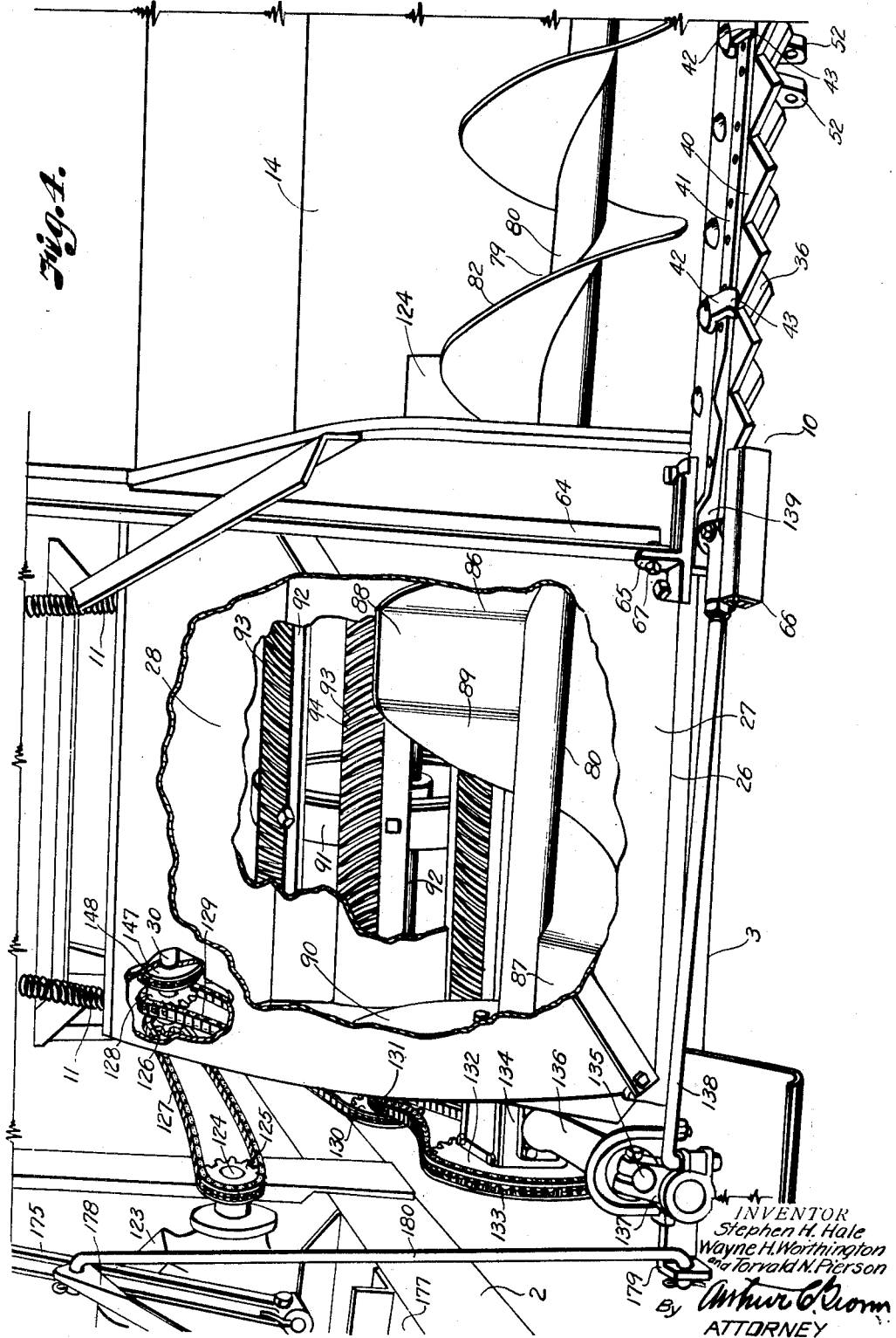

Patented Oct. 18, 1932

1,882,823

UNITED STATES PATENT OFFICE

STEPHEN H. HALE, OF KANSAS CITY, AND WAYNE H. WORTHINGTON AND TORVALD N. PIERSON, OF INDEPENDENCE, MISSOURI, ASSIGNORS TO THE GLEANER COMBINE HARVESTER CORPORATION, OF INDEPENDENCE, MISSOURI, A CORPORATION OF DELAWARE

APPARATUS FOR HARVESTING CORN

Application filed January 20, 1930. Serial No. 421,944.

This invention relates to an apparatus for harvesting maize crops, and more particularly adapted for harvesting corn, the principal object of the invention being to perform all of the operations necessary in harvesting corn directly in the field with a single machine to effect saving in time and labor, and eliminate the usual drudgery incident to corn harvesting.

In accomplishing this and other objects of the invention, we have provided improved details of structure, the preferred form of which is illustrated in the accompanying drawings, wherein:

Fig. 4 is an enlarged, detail, perspective view of a portion of the front of the machine particularly illustrating the sickle and its driving mechanism, and showing a portion of the housing broken away to illustrate the vane on the conveyor for feeding the corn stalks into the shelling cylinder.

Figure 1:
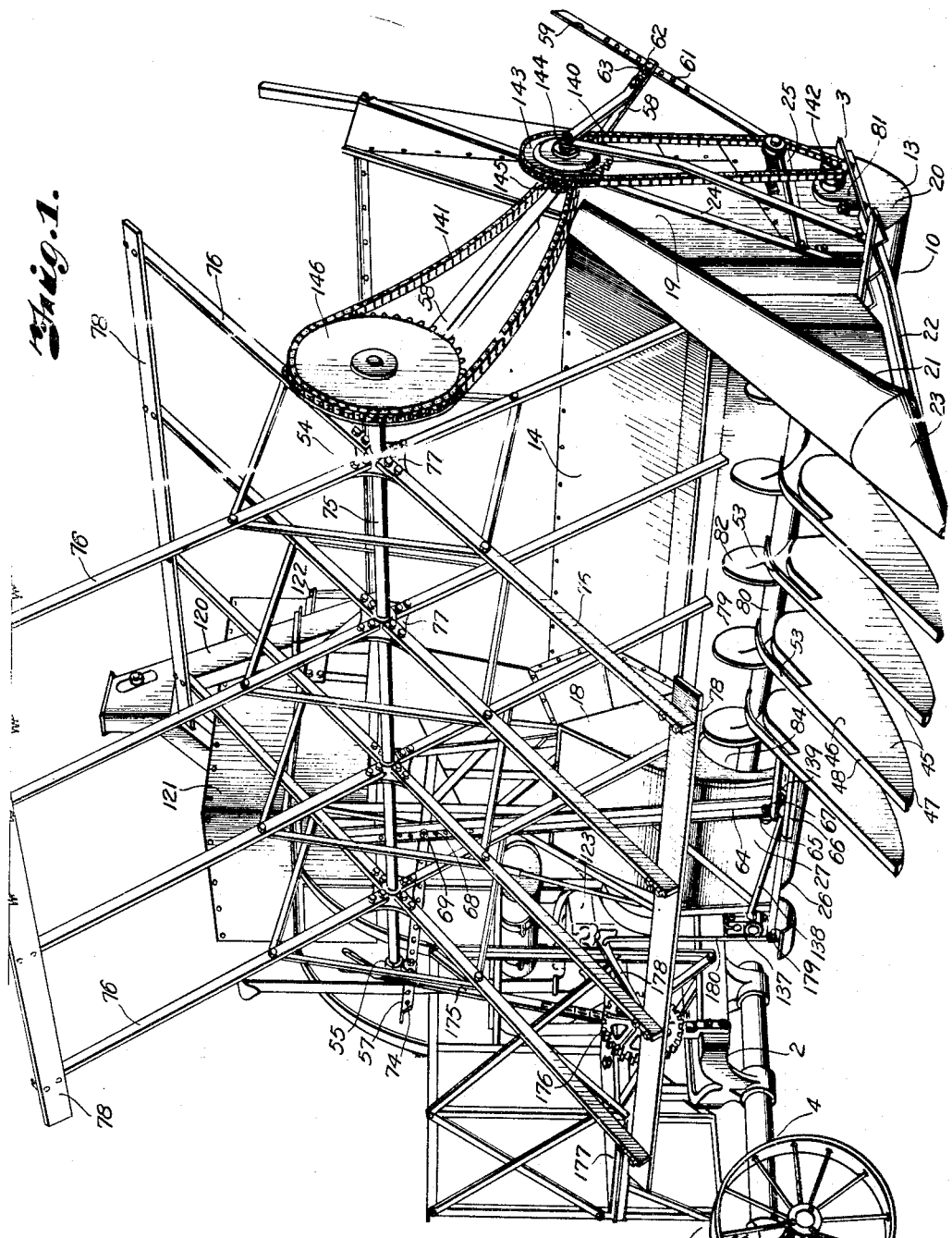
Fig. 1 is a perspective view of a corn harvesting machine constructed in accordance with our invention.

Referring more in detail to the drawings:

1 designates a main frame including a longitudinally extending portion 2 and a lateral portion 3 extending from the longitudinal portion substantially midway of its length, 4 an ordinary steering truck supporting the forward portion of the frame and adapted to be connected with a tractor or other suitable draft means, and the rear portion is carried on a main wheel 5 supporting the longitudinal portion of the frame at a point in substantial alignment with the laterally extending portion 3, and 6 a side wheel aligning with the wheel 5 and supporting the frame at the outer end of the lateral portion 3.

Extending upwardly from the lateral portion 3 of the frame are spaced standards 7 and pivoted to the standards as at 8 are arms 9 carrying at their forward ends a cutting unit designated 10, the cutting unit being balancingly supported from the frame by springs 11 connected with the upper ends of the standards 7 and with brackets 12 attached to the forward ends of the arms 9. The cutting unit includes a trough-shaped pan 13 having a curved bottom attached to the forward ends of the arms 9, and extending upwardly from the rear wall of the pan at a rearward incline is a back board 14 which is braced to the outer arm 9 by a bar 15 connecting the arm with a reinforcing member 16 attached to and extending vertically of the rear side of the back board.

Figure 2:
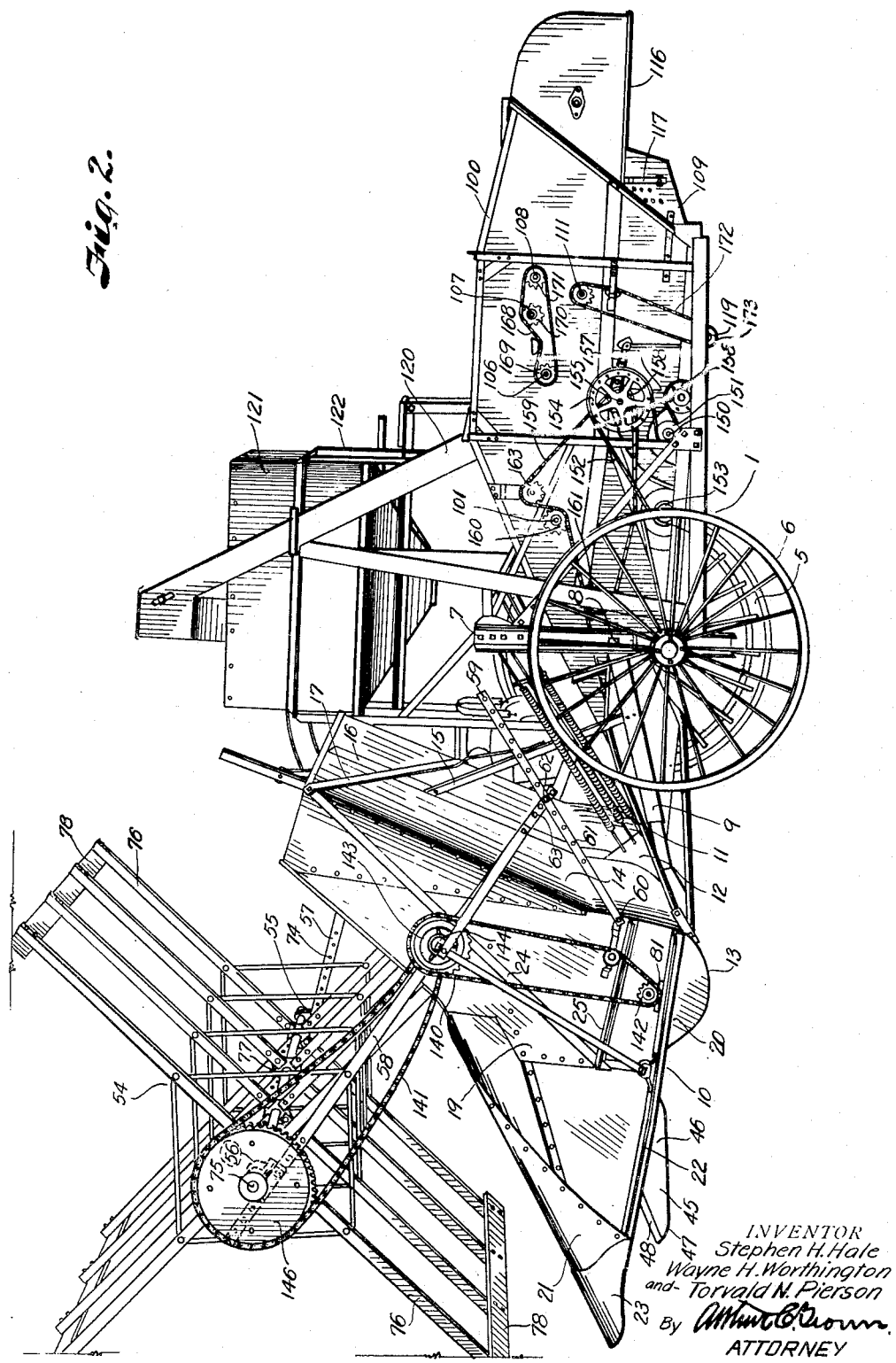
Fig. 2 is a perspective view of the left side of the machine.

The back board is also braced laterally of the arm 9 by a bar 17 connecting the outer upper end of the board with the brace member 15, as shown in Fig. 2. The back board 14 is also provided with upwardly and forwardly extending wings 18 and 19, as best shown in Fig. 1. The outer wing 19 preferably comprises a continuation of the outer end 20 of the pan 13 and cooperates therewith to support a forwardly directed divider member 21, whereby the rows of corn being cut are separated from the next adjacent rows and preferably comprising a triangular-shaped sheet metal form having a substantially cone-shaped forward end for entering between the rows of corn. The divider is braced laterally by an angle bar 22 attached to the end of the pan 13 and extending forwardly to the toe portion 23 of the divider, as shown in Fig. 1. The end of the pan and the wing 19 are also braced by a diagonally extending bar 24 and a horizontal bar 25 riveted to the outer side of the wing and pan as illustrated.

Formed integrally with the opposite end of the pan is a housing 26 including a hood portion 27 extending upwardly and over the pan as shown in Figs. 1 and 4, and a husking and shelling cylinder enclosing portion 28. Preferably integral with the housing 26 and extending rearwardly of the portion 28 is a tubular conveyor housing 29 which is pivoted to the main frame of the machine on a shaft 30 aligned with the pivot points of the supporting arms 9, whereby the conveyor portion may fulcrum with the arms when the cutting unit is raised or lowered as later described.

Fixed to the front edge of the pan is an angle bar 31 for mounting a sickle now described. Bolted to the horizontal leg 32 of the angle 31, by bolts 33, is a blade supporting bar 34 having a forwardly projecting portion 35 (Figs. 4 and 5), having a series of triangular-shaped sickle blades 36 mounted thereon, preferably by rivets 37 extending through tapered openings 38 in the blades 36 and through aligning openings 39 in the supporting bar 34.

Figures 3, 5:
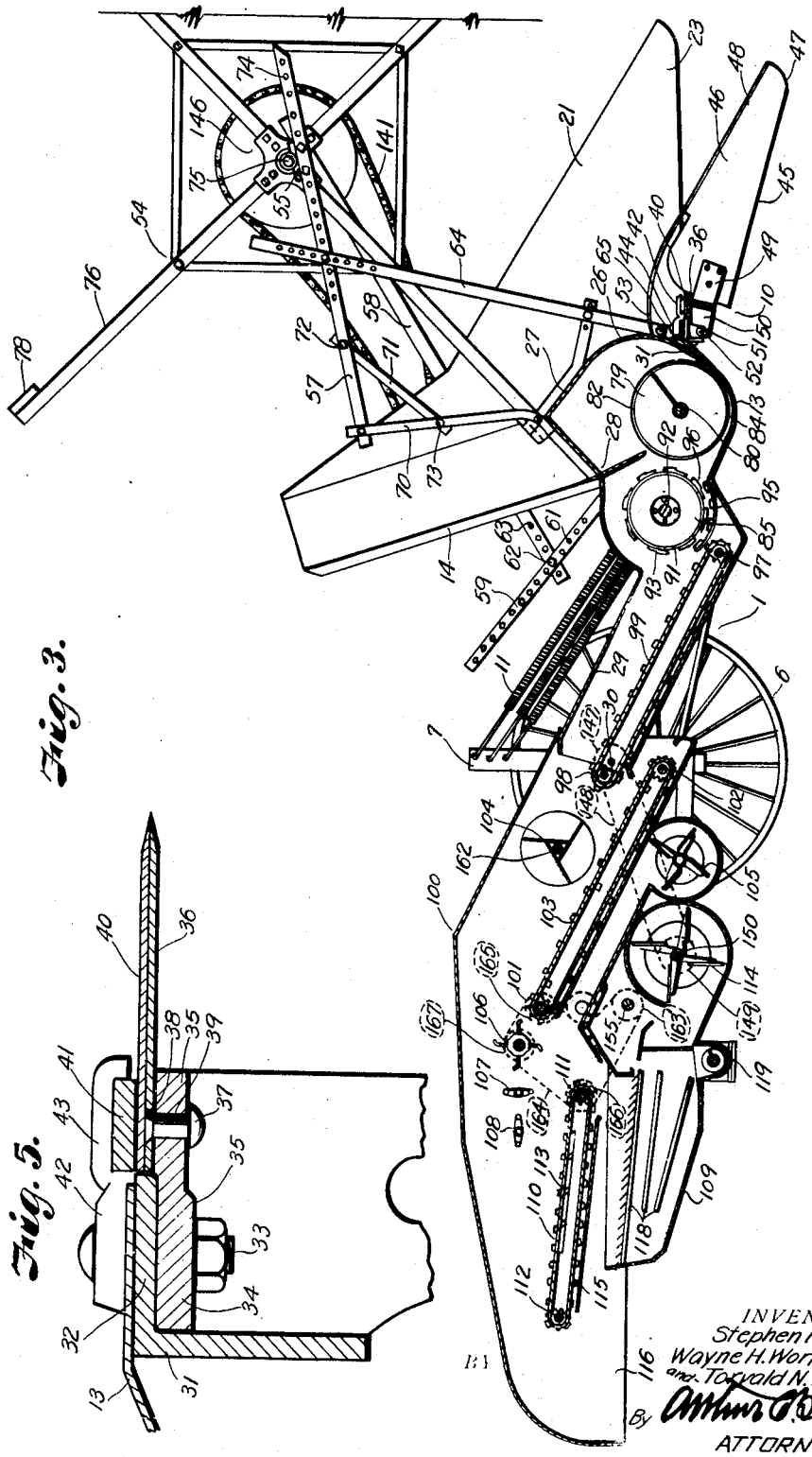
Fig. 3 is a longitudinal, sectional view through the machine particularly illustrating the husking and shelling cylinder and the mechanism for separating the shelled corn from the fodder.
Fig. 5 is an enlarged, detail, sectional view through the sickle and the front portion of the conveyor pan.

40 designates blades complementary to the blades 36 and attached to a bar 41 in substantially the same manner as the blades 36 are attached to their supporting member 34, the bar 41 being retained in sliding position on the blades 36 by sickle clips 42, spaced at intervals along the front of the grain pan and having hook-shaped portions 43 extending over the bar 41 as shown in Fig. 5. The clips are retained by the bolts 33 which extend through the angle 31 and through the blade supporting member 34.

Supported in front of the sickle for sliding contact with the ground are divider members 45 similar to the outer divider member previously described but adapted for raising fallen stalks of corn and separating the stalks of one row from the stalks of adjacent rows, the machine illustrated being designed for cutting two rows of corn and equipped with two pairs of divider members, with the members of each pair spaced to correspond to the spacing of the corn rows, so that a divider of each pair will be projected along the sides of each row of corn as the machine is moved over the ground to raise fallen stalks to upright position.

The divider members 45 comprise triangular-shaped boards 46 having curved forward ends 47 and inclined faces 48 extending upwardly and rearwardly from the curved ends 47. Attached to the rear ends of the dividers are plates 49 having rearwardly extending arms 50 pivotally mounted on bolts 51 carried between pairs of ears 52 formed on the blade supporting member 34. The arms 50 are of sufficient length to provide free pivotal movement of the dividers so that they can rise and fall in conformity with the surface of the ground.

Attached to the upper faces 48 of the dividers 45 are guards 53 which extend rearwardly and downwardly over the sickle to guide the stalks from between the dividers over the sickle into the pan 13.

To assure delivery of the stalks to cutting relation with the sickle, we provide a reel 54 rotatably mounted above the sickle in bearings 55 and 56 on the forward ends of arms 57 and 58 extending forwardly of the machine, and mounted thereon to provide vertical adjustment of the reel.

The arm 58 is pivotally mounted on the wing 19 with its rear end projected rearwardly of the pan, and anchored thereto by a bar 59 pivotally connected with the pan by a bolt 60 and having a plurality of openings 61 adjacent its outer end adapted for receiving a bolt 62 which when inserted through an opening 63 in the end of the arm into one of the openings 61, will support the reel at a height over the sickle bar determined by the particular opening 61 in which the bolt is located.

The other arm 57 is pivotally mounted on the upper end of an angle iron support 64, secured at its lower end to an ear 65 formed integrally with a cross head guide 66 later described, preferably by a bolt 67, as best shown in Fig. 4, the upper end of the upright 64 being provided with a plurality of openings 68 for selectively receiving a bolt 69 also extended through an opening in the arm 57 to support the inner end of the reel in adjusted position. The rear end of the arm 57 is anchored by a bar 70 attached to the rear side of the housing 26, as shown in Fig. 3, and the arm is braced from the member 70 by a bar 71 secured to the arm and bar by bolts 72 and 73, respectively. The forward ends of the reel carrying arms 57 and 58 are provided with spaced openings 74 for securing the bearings 55 and 56 whereby the bearings may be adjusted longitudinally of the arms to space the reel laterally with relation to the sickle bar.

The reel 54 is of ordinary construction including a shaft 75 rotatably mounted in the bearings 55 and 56, radial arms 76 fixed to the shaft at spaced intervals, preferably by plates 77, and slats 78 attached to the outer ends of the arms in accordance with common practice.

Rotatably mounted in the pan 13 and extending longitudinally thereof is a screw conveyor 79 including a shaft 80 rotatably mounted in bearings 81 at the ends of the pan, and a spiral flight 82 fixed on the shaft and adapted for advancing cut stalks toward the husking and shelling cylinder later described.

Located in the rear wall 83 of the housing 26 is an opening 84 through which the cut stalks are discharged into a threshing cylinder 85, and fixed on the conveyor shaft adjacent the opening 84 is a specially constructed vane 86, preferably comprising radially extending flat portions 87 and 88 connected by a curved section 89, as shown in Fig. 4, for changing direction of travel of the stalks.

The end of the shaft adjacent the vane 87 is preferably provided with a disk 90 receiving thrust of the stalks and thereby protecting the end of the housing 26.

The husking and shelling cylinder is preferably of the rasp type comprising spaced disks 91 fixed to a shaft 92 journalled in the sides of the housing 26, and bars 93 fixed on the peripheries of the disks and having rasp-like faces 94 which cooperate with a concave plate 95 positioned below the cylinder and having a plurality of bars 96 complementary to the bars 93 for shucking the corn and shelling the kernels from the cobs as the stalks are passed between the cylinder and the concave as later described.

Mounted in the conveyor housing below the concave 95 is a shaft 97 cooperating with a shaft 98 extending across the housing adjacent to the shaft 30 to support a belt type conveyor 99 for receiving the shredded stalks discharged through the cylinder and for conveying the stalks into the separator mechanism of the machine where the shelled corn is separated from the fodder.

The separator mechanism is enclosed in a housing 100 supported on the longitudinal portion of the frame and having communication with the conveyor housing at its forward end.

Operable over spaced shafts 101 and 102 is a belt conveyor 103 for receiving thereon the fodder discharged from the conveyor 99, and rotatably mounted in the sides of the housing 5 above the conveyor 103 is a beater 104 for removing loose kernels from the fodder as it is being advanced by the conveyor. As the fodder leaves the beater it is subjected to an air blast from a fan 105 positioned in the housing to loosen the fodder so that loose kernels may separate therefrom and to discharge the chaff. The fodder is then further agitated by a series of agitators 106, 107 and 108 so that kernels still retained by the fodder may be loosened and drop through the air blast into a cleaning shoe 109.

The fodder is discharged from the agitators onto a horizontal conveyor 110 run over shafts 111 and 112 rotatably mounted in the sides of the housing, the upper flight of the conveyor operating over a perforated plate 113 through which air is discharged from a fan 114 positioned rearwardly of the fan 105, as shown in Fig. 3, to prevent fodder and dirt from dropping into the cleaning shoe along with the kernels.

Kernels of grain carried over with the fodder are discharged through the slats of the conveyor onto a plate 115 extending crosswise of the conveyor housing below the lower flight of the conveyor so that the slots sliding rearwardly of the plate 115 discharge the grains of corn into the cleaning shoe. The fodder is discharged from the conveyor 110 through an opening 116 formed in the lower portion of the separator housing rearwardly of the cleaning shoe. The cleaning shoe 109 is swingingly supported from the housing 5 by hangers 117, as shown in Fig. 2, and the shoe is provided with a plurality of screens 118 for separating the kernels from small pieces of fodder and dirt carried over the end of the plate 115 with the grains of corn.

From the screens the corn is discharged into a screw conveyor designated 119 extending across the under side of the housing for discharging the kernels into an elevator 120 for elevation into a receiving bin 121 supported from the frame 2 by an angle iron super-structure designated 122.

The various moving parts of the machine are actuated by a motor 123 mounted on the longitudinal portion 2 of the main frame (Figs. 1 and 4), and including a power delivery shaft 124 provided with a sprocket 125 for operating a sprocket 126 on the shaft 30 through a chain 127. Also fixed on the shaft 30 adjacent the sprocket 126 is a sprocket 128 for operating the cylinder 85 through a chain 129 running over the sprocket 128, and a sprocket 130 keyed to the cylinder shaft 92. Keyed to the cylinder shaft adjacent the sprocket 130 is a sprocket 131 for driving a sprocket 132 fixed to the inner end of the conveyor shaft 80 through a chain 133.

Positioned on the shaft 80 between the sprocket 132 and the end of the housing 26 is a transmission, indicated by the housing 134, for actuating a forwardly extending shaft 135 rotatably mounted in a tubular housing 136 projecting from the transmission housing, and fixed to the end of the shaft 135 is a crank 137 for operating the sickle through a pitman 138 connected with the crank and with a cross head 139 operable in the guide 66 previously mentioned, and connected with the sickle bar 41.

The reel 54 is driven from the outer end of the conveyor shaft 80 by a pair of chains 140 and 141 so that the reel may be adjusted without interfering with its driving connections, the chain 140 operating over a sprocket 142 on the shaft 80 and over a sprocket 143 on a stub shaft 144 carried on the arm 58 in axial alignment with its pivotal mounting on the wing, and the chain 141 operates over a sprocket 145 mounted on the shaft 144 in driving relation with the sprocket 143 and over a sprocket 146 on the reel shaft.

147 designates a sprocket wheel also fixed to the shaft 30 adjacent the sprockets 126 and 128, and operating over the sprocket 147 is a chain 148 for actuating a sprocket wheel 149 on the shaft 150 of the fan 114 to drive the fan and the separator mechanism as now described. Mounted on the opposite end of the fan shaft 150 is a pulley 151 and operating thereover is a belt 152 running over a pulley 153 on the fan 105, and over a pulley 154 on a countershaft 155 which is rotatably mounted in the sides of the separator housing 100, the belt being tightened about the pulleys by an idler pulley 156.

Operable by the shaft 155 is an eccentric arm 157 for reciprocating the cleaning shoe 109. Also fixed on the countershaft is a sprocket 158 for driving a chain 159 running over a sprocket 160 on the end of the conveyor shaft 101 and over a sprocket 161 on the shaft 162 of the beater 106 for driving the conveyor 99 and the beater, the chain being tensioned about the sprockets by an idler sprocket 163.

Fixed to the opposite end of the countershaft is a sprocket wheel indicated by the dotted lines 163', for operating the conveyors 103 and 110 and the agitator 106 by a chain 164 running over sprockets 165 and 166 on the conveyor shafts 101 and 111 and a sprocket 167 on the agitator shaft.

The agitators 106 and 108 are driven by a chain 168 running over a sprocket 169 on the end of the agitator shaft 106 and over sprockets 170 and 171 on the ends of the agitator shafts 107 and 108.

The conveyor 119 is operated by a chain 172 running over a sprocket on the conveyor shaft 111 and over a sprocket 173 on the end of the conveyor shaft 174.

In order to raise and lower the cutting mechanim, we provide a lever 175 for operating a ratchet wheel 176 that is mounted on the side of a platform 177 (Figs. 1 and 4), and extending from the ratchet wheel 176 is an arm 178 which is connected with a forwardly extending ear 179 attached to the inner end of the angle 31 previously described by a link 180.

When a machine constructed and assembled as described is moved through a field of corn, two adjacent rows of stalks will enter between the divider members 45, which, being skidded along the ground, will tend to separate fallen stalks in such rows from those of adjacent rows and raise the fallen stalks into position to be engaged by the reel 54 by which they are retained in upright position so that they may be severed by the sickle along with the standing stalks. As the machine advances the reel moves the severed stalks into the pan and the upward sweep of the reel in its rotation supports the stalks in a vertical position against the back board until their lower ends are caught by the screw conveyor which draws the stalks downwardly into the pan and moves them along the pan and feeds them into the shucking and shelling cylinder. As the stalks near the end of the pan they enter under the hood portion of the housing 26 and are diverted by the vane 86 into the cylinder 85 where the ears of corn are shucked and the grains are shelled from the cobs.

The stalks are reduced on passing through the cylinder and the fodder is discharged onto the conveyor which moves the material including the shelled corn, into the separating mechanism where the shelled corn is separated from the fodder and dropped into the cleaning shoe.

From the cleaning shoe the grain is discharged into the conveyor 119 which moves it to the elevator 120 for delivery into the bin 121. The fodder, separated from the shelled corn, is discharged from the rear of the machine into windrows for subsequent removal from the field.

What we claim and desire to secure by Letters Patent is:

1. In a machine of the character described, a frame, a pan supported on the frame for receiving corn stalks, a sickle supported in front of the pan for cutting the corn stalks, a conveyor in the pan for removing the corn cut by the sickle, a reel supported above the pan for directing corn stalks into contact with the sickle, means pivotally related to the pan and supported in front of the sickle for raising fallen stalks into position to be engaged by the reel, and a back board on the pan cooperating with the reel to support cut stalks in feeding relation with the conveyor.

2. In a machine of the character described, a frame, a pan carried by the frame, a conveyor in the pan, a sickle supported in front of the conveyor for cutting corn stalks, a reel supported above the pan for directing corn stalks into contact with the sickle and moving the cut stalks into the conveyor, divider members mounted in pivoted relation to the pan in front of the sickle for raising fallen stalks into position to be engaged by the reel, and a back board on the pan cooperating with the reel to support cut stalks in feeding relation with the conveyor.

3. In a machine of the character described, a frame, wheels supporting the frame, a cornstalk receiving pan pivotally supported from the frame, a sickle mounted on the pan, a reel rotatably mounted above the pan for feeding stalks into the sickle, means mounted for pivotal movement independent of the pan for raising fallen stalks, a husking and a shelling cylinder on the frame, a conveyor rotatably mounted in the pan for feeding the cut stalks into said cylinder, and means associated with the pan and cooperating with the reel for supporting the butt ends of said stalks in feeding relation with the conveyor.

4. In a machine of the character described, a frame, wheels supporting the frame, a cornstalk receiving pan pivotally supported from the frame, a sickle mounted on the pan, means in front of the sickle for raising fallen stalks, a husking and a shelling cylinder on the frame, a conveyor screw rotatably mounted in the pan for feeding the cut stalks into said cylinder, a back board on the pan, means cooperating with the back board for supporting cut stalks to bring the butt ends of said stalks into engagement with said conveyor screw to draw the stalks into parallel reclining relation with said conveyor screw, and means on the frame for separating the shelled corn from the fodder.

5. In a machine of the character described, a mobile frame, a corn husking and shelling mechanism on the frame, a cornstalk receiving pan on the frame, a sickle for cutting standing cornstalks, a reel rotatably supported above the sickle and the pan for retaining the standing stalks in position to be severed by the sickle, a screw conveyor in the pan for feeding the cut stalks into the husking and shelling mechanism, and a back board supported by the pan and cooperating with the reel for supporting the cut stalks in a vertical position while the butt ends thereof are being engaged by the conveyor to effect drawing in of the stalks parallel with said screw conveyor.

6. In a machine of the character described, a mobile frame, a corn husking and shelling mechanism on the frame, a cornstalk receiving pan on the frame, a sickle for cutting standing cornstalks, a reel rotatably supported above the sickle and the pan for retaining the standing stalks in position to be severed by the sickle, a screw conveyor in the pan for feeding the cut stalks into the husking and shelling mechanism, and means cooperating with the reel for retaining the stalks in a vertical position while being engaged by the conveyor whereby the stalks are fed toward the husking and shelling mechanism butt ends first.

7. In a machine of the character described, a mobile frame, a single corn shredding and shelling means on the frame, a cornstalk receiving pan on the frame, a sickle for cutting standing cornstalks, a reel rotatably supported above the sickle for retaining the standing stalks in position to be severed by the sickle, a screw conveyor in the pan for feeding the cut stalks into the husking and shelling mechanism, and an inclined back board supported by the pan cooperating with the reel whereby the stalks when engaged by the conveyor are positioned longitudinally of the pan.

8. In a machine of the character described, including a frame, wheels supporting the frame and a cleaning and separating unit on the frame, a corn cutting unit pivotally supported on the frame comprising a stalk receiving pan, a husking and shelling cylinder at one end of the pan and aligned with the separating unit, a sickle supported at the front of the pan, a reel rotatably supported above the sickle for feeding stalks into the pan, stalk raising and guiding members pivotally supported by the pan in front of the sickle, means in the pan for feeding the cut stalks into the husking and shelling cylinder, and a back board on the pan cooperating with the reel for positioning the stalks longitudinally of the pan.

9. A machine for harvesting corn comprising a mobile frame, a pan pivotally supported on the frame for receiving corn stalks, a stalk-cutting mechanism associated with the pan, corn stalk gathering means supported by the pan for directing corn stalks into contact with the cutting mechanism, a corn stalk reducing and shelling cylinder carried by the frame, a screw conveyor rotatably mounted in the pan for conveying the corn stalks to said cylinder, and means associated with the gathering means and the screw conveyor for feeding the stalks toward the reducing and shelling cylinder, butt ends first.

10. A machine for harvesting corn comprising a mobile frame, a pan pivotally supported on the frame for receiving corn stalks, a stalk-cutting mechanism associated with the pan, corn stalk gathering means supported by the pan for directing corn stalks into contact with the cutting mechanism, a corn stalk reducing and shelling cylinder carried by the frame, a screw conveyor rotatably mounted in the pan for conveying the corn stalks to said cylinder, means associated with the gathering means and the conveyor for feeding the stalks toward the reducing and shelling cylinder, butt ends first, and means associated with the reducing and shelling cylinder for separating shelled kernels from the reduced stalks discharged from said cylinder.

11. A machine for harvesting standing corn stalks from a field including a mobile frame, a pan supported in front of the frame and extending transversely thereof for receiving corn stalks, a corn shelling and shredding cylinder supported adjacent an end of the pan, a screw conveyor in the pan for laterally diverting corn stalks to the shelling and shredding cylinder, a stalk cutting mechanism associated with the pan, corn stalk gathering means supported in front of the pan and for directing the butt ends of said stalks into engagement with the screw conveyor, an upwardly extending back board on the pan for supporting the stalks in upright position while the butt ends of the stalks are being engaged by the conveyor whereby the stalks are drawn from said upright position into a reclining position longitudinally of the conveyor screw for feeding butt ends first to the cylinder, and means associated with the shelling and shredding cylinder for separating shelled kernels from the shredded material discharged from said cylinder.

12. In a machine of the character described, a frame, wheels supporting the frame, a corn stalk-receiving pan supported transversely of the frame, corn cutting means associated with the pan, a screw conveyor rotatably mounted in the pan, a reel rotatably mounted above the pan and operable over said conveyor to bring the corn stalks severed by the cutting means into engagement with the screw conveyor, and means on the back of the pan cooperating with the reel for supporting the stalks during their initial engagement with said screw conveyor.

13. In a machine of the character described, a frame, wheels supporting the frame, a corn stalk-receiving pan supported transversely of the frame, corn cutting means associated with the pan, a screw conveyor rotatably mounted in the pan, a reel rotatably mounted above the pan and operable over said conveyor to bring the corn stalks severed by the cutting means into engagement with the screw conveyor, means on the back of the pan cooperating with the reel for supporting the stalks during their initial engagement with said screw conveyor, and means supported in front of the pan and below the reel for guiding the corn stalks into engagement with the corn cutting means.

14. In a machine of the character described, a frame, wheels supporting the frame, a corn stalk-receiving pan supported transversely of the frame, corn cutting means supported in front of the pan, means supported in front of the corn cutting means for guiding the corn into engagement therewith, a screw conveyor rotatably mounted in the pan, and a reel operable over the conveyor and said corn stalk guiding means for directing the corn stalks into engagement with the cutting means and supporting the cut stalks with their butt ends in engagement with the conveyor screw whereby the stalks are drawn into parallel engagement with the screw for movement longitudinally of the pan.

In testimony whereof we affix our signatures.

STEPHEN H. HALE.
WAYNE H. WORTHINGTON.
TORVALD N. PIERSON.